US00RE40810E

(19) United States
(12) Reissued Patent
McCarty, Jr.

(10) Patent Number: US RE40,810 E
(45) Date of Reissued Patent: Jun. 30, 2009

(54) REDUCED MIPS PULSE SHAPING FILTER

(76) Inventor: Robert J. McCarty, Jr., 6421 Blacktree Dr., Plano, TX (US) 75093

(21) Appl. No.: 11/826,023

(22) Filed: Jul. 11, 2007

Related U.S. Patent Documents

Reissue of:
(64) Patent No.: 6,917,657
Issued: Jul. 12, 2005
Appl. No.: 09/813,266
Filed: Mar. 20, 2001

(51) Int. Cl.
*H04L 7/00* (2006.01)
*H03D 1/00* (2006.01)

(52) U.S. Cl. ..... 375/355; 375/342; 375/350
(58) Field of Classification Search ..... None
See application file for complete search history.

(56) References Cited

U.S. PATENT DOCUMENTS 5,768,323 A 6/1998 Kroeger et al.
5,812,608 A 9/1998 Valimaki et al.
5,881,110 A * 3/1999 Cochran ..... 375/324
6,295,325 B1 * 9/2001 Farrow et al. ..... 375/327
6,359,878 B1 * 3/2002 Lakkis et al. ..... 370/350
6,381,267 B1 * 4/2002 Abdelilah et al. ..... 375/222
6,477,215 B1 11/2002 Temerinac
6,628,736 B1 9/2003 Legrand et al.
6,674,822 B1 1/2004 Legrand et al.
7,003,016 B1 * 2/2006 Hosur et al. ..... 375/145
7,164,662 B2 * 1/2007 Preston et al. ..... 370/328

* cited by examiner

*Primary Examiner*—Khanh C Tran
(74) *Attorney, Agent, or Firm*—Connolly Bove Lodge & Hutz LLP

(57) ABSTRACT

In a communication system in which an incoming signal is pulse shaped prior to detecting the information bearing point of the signal, processing overhead can be significantly reduced by only processing the sample points corresponding to the information bearing point and two points bounding the information bearing point. During signal acquisition, the signal is over sampled and the pulse shaping filter processes every sample point, or every Nth sample point in the case of down sampling. Once the sample point corresponding to the information bearing point is determined, the pulse shaping filter can be instructed to only process the sampling corresponding to the information bearing point and two neighboring samples. The system and method is adaptive, in that the samples that are processed can shift as the information bearing point shifts relative to the sample points. This is accomplished by re-synchronizing the timing of the received slot.

49 Claims, 3 Drawing Sheets

502
111
113
1.0
500
115
107
109
117
0.5
105
119
101
103
123
121
125
0
504
504
504
504
AMPLITUDE
-4T
-3T
-2T
-T
0
T
2T
3T
4T
TIME, NORMALIZED TO T

MODE SELECT
260KHZ
206
52KHZ
208

332
330
334a
334b
334c
334n
208
336
340
342
338

REDUCED MIPS PULSE SHAPING FILTER

Matter enclosed in heavy brackets [ ] appears in the original patent but forms no part of this reissue specification; matter printed in italics indicates the additions made by reissue.

RELATED APPLICATIONS

This application is related to co-pending patent application Ser. No. 09/561,706 entitled System and Method for Signal Synchronization in a Communication System and to co-pending patent application Ser. No. 09/302,078 entitled Nyquist Filter and Method, both of which applications are incorporated herein by reference.

FIELD OF THE INVENTION

The present invention relates generally to communications and particularly to reduced MIPs processing for a digital filter.

BACKGROUND OF THE INVENTION

The use of digital pulse shaping filters in digital communication systems is well known. Co-pending patent application Ser. No. 09/302,078 describes a novel digital pulse shaping filter that can be employed in a wireless communication system. Other pulse shaping filters are known in the art, including Nyquist filters, raised cosine filters, and the like. The teachings of the present invention apply to all such digital filters.

Various techniques for synchronizing a received signal in order to determine the information bearing point of the signal are also known. A novel approach to signal synchronization is provided in co-pending patent application Ser. No. 09/561,706. As taught in that application, a receiving device can synchronize to an incoming signal by taking advantage of a property of pulse shaping filters, specifically that the relative energy distribution of the output waveform with respect to the information bearing point of the signal is determinable. In one preferred embodiment of that application, the magnitude of the signal coming out of the pulse shaping filter is measured (over time) and from the measurement of the magnitude—which is related to the energy distribution of the signal—the information bearing point is determined and synchronized to.

The above described approach provides significant information throughput efficiency and the ability to synchronize on a signal without the need for pilot symbols or synchronizing tones. The improvements come at a cost of extensive signal processing requirements, however. This is because—even though there is only one information bearing point for each transmitted symbol—the incoming signal is sampled at a much higher rate than the symbol rate in order to ensure that at least one sample is at or very near the information bearing point. As such, each sample must be digitally processed, even though only one sample (or sometimes two or three in the case of interpolation) is ultimately useful for decoding the signal.

SUMMARY OF THE INVENTION

In one aspect, the present invention provides for a method for synchronizing with a transmitted signal method comprising receiving said transmitted signal, wherein the signal comprises a periodic information bearing point at an information rate and wherein an information period is the inverse of said information rate and sampling the signal at a sampling rate greater than said information rate. The method further comprises, during a first predetermined number of information periods, filtering each of N sample points for each information bearing point with a pulse-shaping filter and outputting a filtered signal, measuring a variable of said filtered signal at each of said N sample points, wherein said variable is independent of information content in said signal, determining the location of said information bearing point in said signal based on said information content-independent variable, identifying one of the N sample points that most closely corresponds to said information bearing point in said signal, and synchronizing processing of said signal with said information bearing point. The method further comprises, during a second number of subsequent information periods, filtering a subset of the N sample points for each subsequent information period, the subset of the N sample points including the identified one of the N sample points.

In another aspect, the invention provides for a telecommunication receiver capable of synchronizing with a received signal The receiver includes an analog-to-digital converter receiving an information signal, wherein said signal comprises a periodic information bearing point at an information rate, and wherein an information period is the inverse of said information rate, and a pulse shaping filter coupled to receive a digital signal from said analog-to-digital converter and to receive a control signal from a synchronization unit, wherein said digital signal comprises N sample points per said information period, the pulse shaping filter configured to operate in a first mode in which each of N sample points per information period is filter and a second mode in which a subset of N sample points per information period is filtered. The receiver further includes a synchronization unit coupled to receive a pulse shaped sampled signal from said filter. The synchronization unit comprises a detector determining values of a variable of said signal at said N sample points when said pulse shaping filter is operating in said first mode and of said subset of N sample points when said pulse shaping filter is operating in said second mode, wherein said variable is independent of information content in said signal, an accumulator to accumulate said detected values for each of said sample points which occurs at the same relative sample location within each information period, wherein there are (sample rate)/(information rate) sample locations within each information period, sample bins for storing said accumulated values for said sample locations, and a comparator for comparing said accumulated values in said sample bins, wherein the location of said information bearing point in said signal is determined based on said accumulated information content-independent values. The unit further comprises an identifier for identifying the relative sample location most closely corresponding to the information bearing point, and a control signal generator for generating a control signal to said pulse shaping filter, the control signal including the identify of the identified relative sample location.

The present invention provides embodiments having an advantage of reduced operations (MIPS) in the processing and filtering of the incoming signal. Another advantage provided by embodiments of the present invention is the ability to switch between a full processing mode during signal acquisition and a reduced processing mode once the signal has been synchronized to.

The preferred embodiments described herein are by way of example only and are not intended to define or limit the invention which is described by way of the appended claims.

DESCRIPTION OF THE PREFERRED EMBODIMENTS

Figure 1:
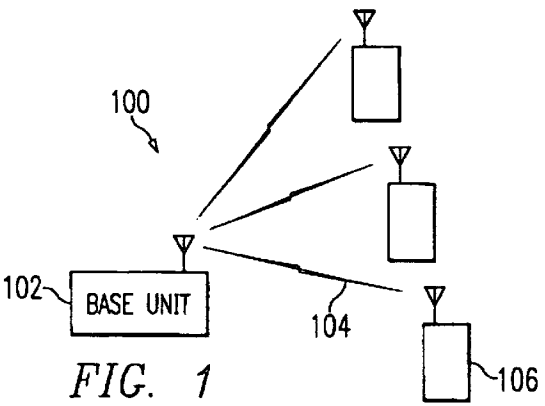
FIG. 1 illustrates an exemplary radio system in which preferred embodiments of the present invention may be deployed.

FIG. 1 illustrates an exemplary radio system 100. System 100 could be a cellular telephone system, a two-way radio dispatch system, a localized wireless telephone or radio system or the like. Base unit 102 can communicate over transmission medium 104 to one or more terminal units 106. Transmission medium 104 in this example represents the wireless communication spectrum. Terminal units 106 can be mobile units, portable units, or fixed location units and can be one-way or two-way devices. Although only one base unit is illustrated, radio system 100 may have two or more base units, as well as interconnections to other communication systems, such as the public switched telephone network, the internet, and the like.

In the preferred embodiments, the system provides for half duplex communications. The teachings of the present invention, however, apply to full duplex systems, as well as to time division duplex, simplex and other two-way radio systems. In some preferred embodiments, each base unit 102 transmits on only a single (e.g., 25 kHz bandwidth) frequency channel. Hence for a system that is licensed to operate on ten channels, ten base stations would be required. In alternative embodiments, the base station can be configured to transmit and receive across multiple channels. This feature would be particularly beneficial for those systems which are licensed to operate across several contiguous channels.

In the preferred embodiment, the system uses two-ring differential QAM with a 16 point constellation and Gray coding for signal encoding. The teachings of the present invention, however, apply to other modulation schemes, such as three-ring QAM, star QAM, square QAM, coherent QAM, phase shift keying ("PSK"), differential PSK ("DPSK"), and the like.

Figure 2:
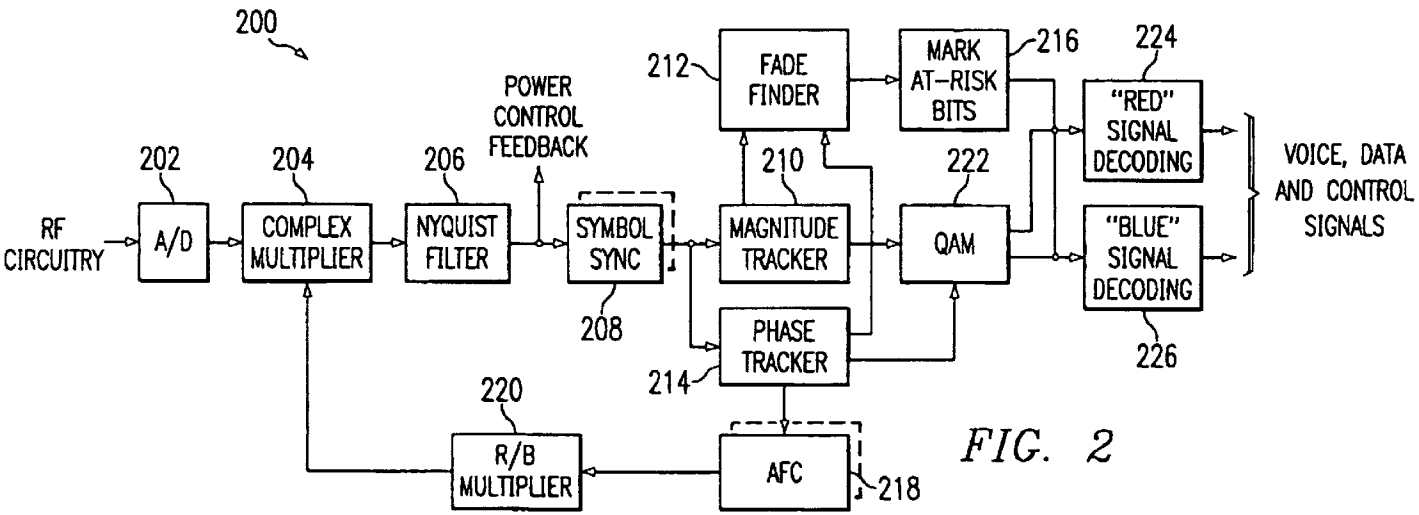
FIG. 2 is a block diagram of a preferred embodiment base unit operating in receiver mode.
Figure 3:
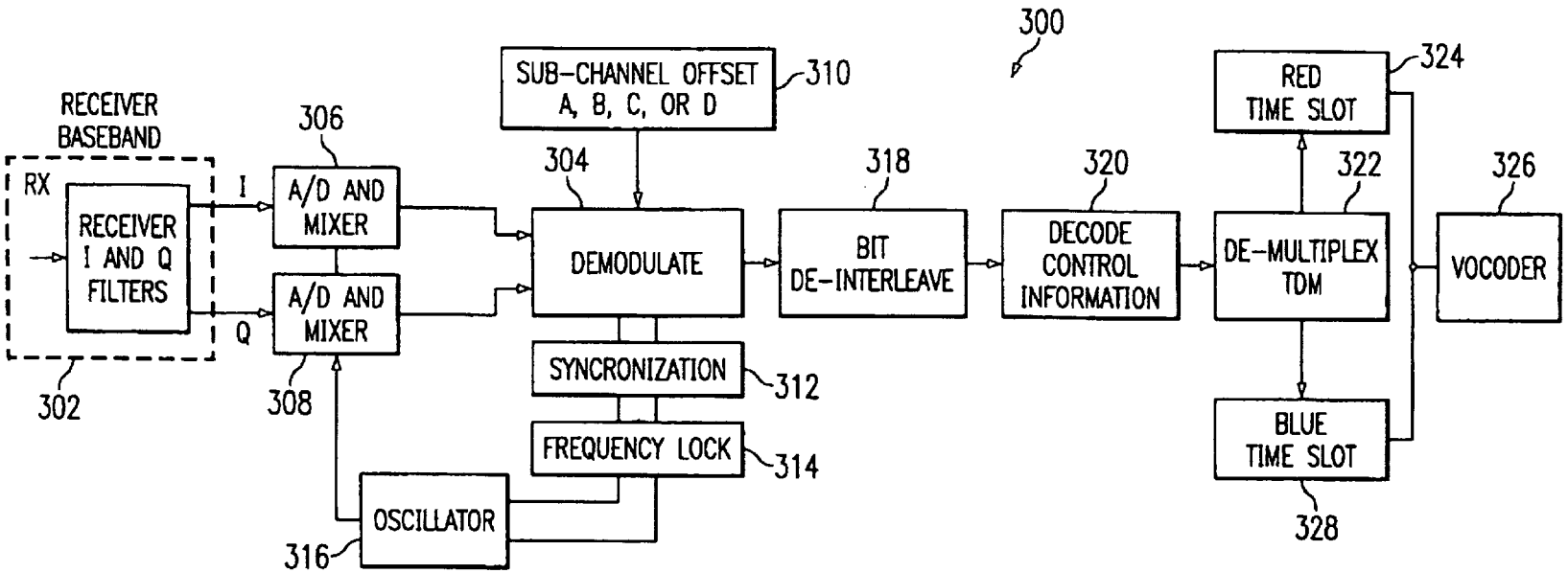
FIG. 3 is a block diagram of a preferred embodiment terminal unit operating in receiver mode.

Details of portions of the base unit and terminal units illustrated in FIG. 1 are provided in the following descriptions. FIG. 2 is a block diagram of base unit 102 operating in receiver mode, while FIG. 3 is a block diagram of terminal unit 106 operating in receiver mode. A skilled practitioner will note that several components of a typical radio transmitter/receiver not necessary to an understanding of the invention have been omitted.

FIG. 2 is a block diagram of receiver 200 in base unit 102. Signals from terminal units 106 are received by RF receiving circuitry (not shown). A/D converter 202 receives the signal from the RF receiving circuitry and converts it to a digital signal, which is fed to one or more sub-channel paths. A detailed discussion of the sub-channel paths is provided in patent application Ser. No. 09/295,660. Complex multiplier 204 removes the frequency offset corresponding to a particular sub-channel from the incoming signal. The signal is then frequency channelized by the square root Nyquist matched filter 206.

The filtered signal is passed to symbol synchronization block 208, which calculates the proper sampling point where there exists no (or minimal) inter-symbol interference signal. As disclosed by patent application Ser. No. 09/295,660, this is accomplished by calculating the magnitude of the sample points over time and selecting the highest energy points (corresponding to the synchronized symbol sample points). The signal is then passed on to magnitude tracking block 210 and to phase tracker 214. A detailed discussion of the reminder of the base unit receiver circuitry, including blocks 218–226, is provided in patent application Ser. No. 09/295,660.

FIG. 3 is a block diagram of receiver 300 in terminal units 106. Signals from the base unit or another terminal unit are received by RF receiving circuitry 302 where the RF signal is down-converted and filtered before being passed to A/D converter and mixer 306 for the in-phase ("I") component and 308 for the quadrature ("Q") component. After analog to digital conversion, the frequency offset associated with the sub-channel selection is removed from the signal components by mixing into the received signal a signal complementary to the offset signal. The complementary offset signal is determined by sub-channel frequency offset control information, as illustrated by block 310 and depends on the sub-channel which the terminal unit is receiving. The digital signals are then demodulated to a real binary signal in demodulator 304. The digital binary signal is then de-coded and further processed in blocks 318–328 as described in the disclosure of patent application Ser. No. 09/295,660.

Slot and symbol synchronization is provided for in synchronization block 312. Symbol synchronization is performed first. As disclosed by patent application Ser. No. 09/295,660, symbol synchronization is accomplished by sampling the incoming signal and time averaging the samples. Then the sample points with the highest average power at the over-sample rate are detected. Preferably, the actual sample point is determined using a quadratic interpolation based on the three sample points with the highest average power. Symbols can then be identified using known digital signal processing techniques. Once the receiver has synchronized on the symbol time and locations, slot synchronization is accomplished using slot sync symbols, by identifying patterns representing the known sync symbols, which should repeat every 120 symbols (i.e., every slot or time frame).

Figure 6:
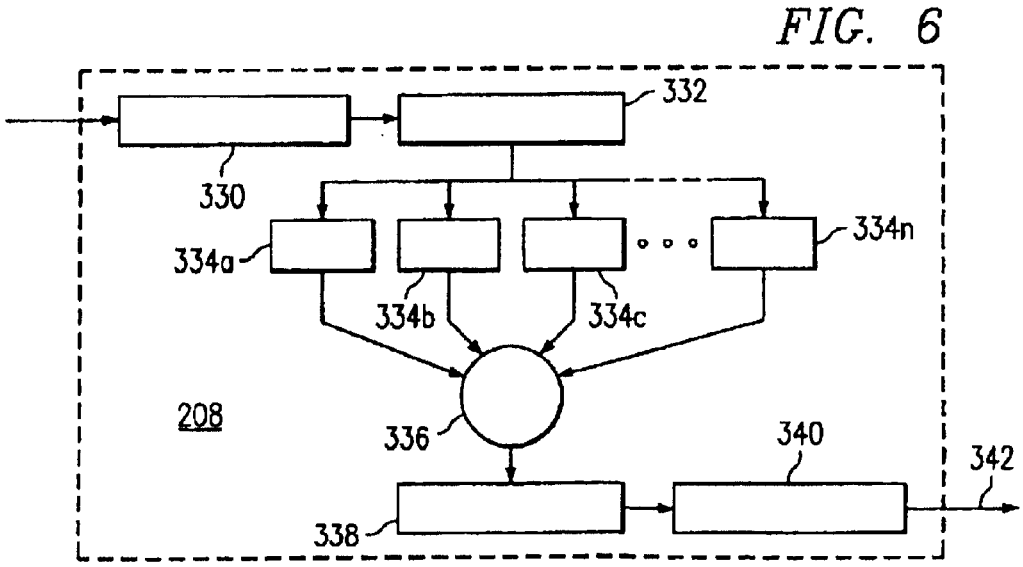
FIG. 6 illustrates various components of synchronization unit.

Further details regarding synchronization unit 312 will be provided with reference to FIG. 6. While FIG. 6 illustrates the various components of synchronization unit 312 as separate blocks, one skilled in the art will recognize that the various blocks can represent routines or software running on a digital signal processor or microprocessor as well as representing dedicated circuits. Synchronization unit 312 includes a detector 330 that determines values of a variable of the pulse sampled signal at N sample points when the pulse shaping filter is operating in its first mode and a subset of N sample points when the pulse shaping filter is operating in a second mode. The variable is independent of the information content of the signal. Accumulator 332 accumulates the detected values for each of the sample points that occurs at the same relative sample location within each information period, recognizing that there are (sample rate)/(information rate) sample locations within each information period. The accumulated values are stored in sample bins 334a, 334b, . . . 334n. Comparator 3346 compares the accumulated values stored in the sample bins and, based on the accumulated information content-independent values, determines the location of the information bearing point. Identifier 338 is used to identify the relative sample location most closely corresponding to the information bearing point. Control signal generator 340 generates a control signal to the pulse shaping filter that includes the identity of the identified relative sample location.

Returning now to FIG. 2, and in particular to Nyquist filter 206 in FIG. 2, the information-bearing point in the output of pulse shaping Nyquist filter 206 is the point in the signal with minimum inter-symbol interference patent application Ser. No. 09/302,078, filed Apr. 28, 1999, entitled Nyquist Filter And Method, provides a detailed discussion of the properties and implementation of Nyquist filters in a communications system. However, any type of Nyquist filter may be used with the present invention, including a raised cosine filter or other filters such as those disclosed in patent application Ser. No. 09/302,078.

Figure 4:
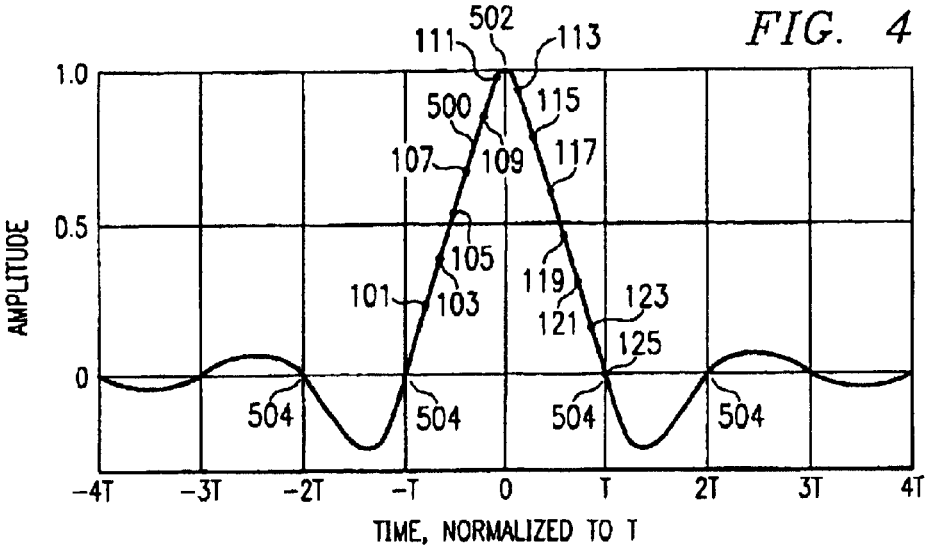
FIG. 4 illustrates an example of a Nyquist filter impulse response.

In a preferred embodiment, the pulse shaping filter uses a pair of matched filters, one for transmit and one for receive. The convolution of the transmit filter with the receive filter forms the complete pulse shaping filter. Inter-symbol interference is generally avoided because the combined filter impulse response reaches unity at a the information bearing point and is zero periodically at every other information point (Nyquist sampling rate). FIG. 4 illustrates an example of Nyquist filter impulse response 500. Peak 502 occurs at the information bearing point, and zeros 504 occur at the other points at the information rate. At a point in the signal other than the information bearing point, the output waveform from the Nyquist filter may have associated with it the energy of perhaps five or ten symbols. Generally, only at the information bearing point is the energy of output waveform from the Nyquist filter associated with only one symbol. In addition, it is at this point that the signal has the highest energy, on average.

Therefore, in a preferred embodiment, symbol synchronization block 208 determines the single sample point that has the highest energy, on average. This point represents the information bearing sample point, allowing synchronization to the signal. Fixed symbol values or patterns are therefore not required for symbol synchronization.

Preferably, the variable used to measure the average energy of the waveform is the sum of the squares of the I and Q components. Alternatively, magnitude or any other variable that approximates signal energy may be used. In addition, the energy of either the I or Q or both components by itself may be used.

Figure 5:
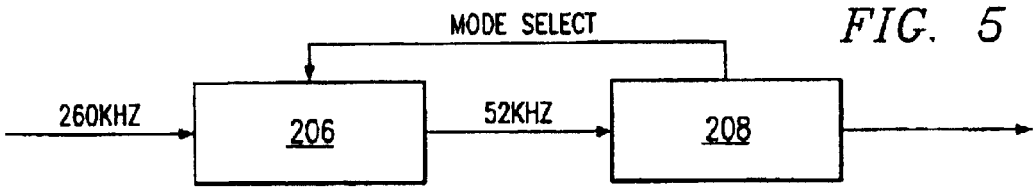
FIG. 5 provides details regrading the operation of an exemplary pulse shaping filter.

Further details regarding the operation of the filter 206 and its operation synchronization will now be provided with reference to FIG. 5. As illustrated, pulse shaping filter 206 receives an incoming data stream at a sample rate of 260 kHz. The data stream is first down sampled by five, giving the 52 kHz sampling rate (i.e. 13 times over-sampling for a 4 kHz signal) for the pulse shaping filter operation. The signal is subcarrier offset digitally and passed to the pulse shaping function of filter 206 as described in detail in co-pending application Ser. No. 09/302,078. In the preferred embodiments, the pulse shaping filter has 209 tap coefficients. The signal is then passed to synchronization block 208 where the information bearing point is determined, as described above.

Note that pulse shaping filter 206 must perform over 24 MIPS (million of instructions per second) (52 kHz sampling rate times 209 tap coefficients for both the I component and the Q component of the signal, pulse processing overhead). This requires significant processing bandwidth. The processing requirements can be significantly reduced, however, once the information bearing point is determined. As described above, this is accomplished by synchronization block 208. Once the particular sample point that most closely matches the information bearing point Ouch as peak 502 in FIG. 4), then only that sample actually needs to be processed by pulse shaping filter 206 for future symbols. This is because the information bearing sample point shifts very slowly over time, so the calculated sample point for a symbol may be updated very slowly. Updating the sample point can be accomplished by a pulse shaping filter 206 that operates in one of two modes—either a full processing mode or a reduced processing mode. Once the information bearing point is determined, the received slot can be adjusted (i.e. the clock adjusted) to ensure that the desired sample occurs at that same point thereafter for each symbol thereafter.

Referring again to FIG. 4, thirteen samples are illustrated, 101 through 125. When pulse shaping filter 206 operates in full processing mode, each of the thirteen samples 101 through 125 is processed in the filter. As discussed above, this results in over 20 MIPS per symbol. Note that, at the time the signal is passed through pulse shaping filter 206, there is no way of determining which sample is closest to the information bearing point (i.e. which sample is closest to peak 502). This is determined in synchronization block 208 as described above.

In the illustrated case, synchronization block 208 will determine that sample 111 is closest to the information bearing point, peak 502. In the preferred embodiments, synchronization block 208 will use the information (e.g. the magnitude) of points 109, 111, and 113 to interpolate the value for the actual peak point. Once sample 111 has been identified as the information bearing point (or closest thereto), one can obtain the desired signal information simply from point 111, or more preferably from points 109, 111, and 113 with interpolation.

This information can be fed back to the pulse filter shaping process in order to reduce MIPS processing overhead. Upon command from synchronization block 208, pulse shaping filter 206 will enter its reduced processing mode. This means that pulse shaping filter 206 will only process three samples for each symbol. Those three samples are the sample corresponding to the sample points 109, 111, and 113. The remaining samples, i.e. samples 101 through 107 and 115 through 125, do not provide any meaningful information about the information bearing point, and hence do not need to be processed by pulse shaping filter 206. Recall from above that each symbol required over 20 MIPS processing when in full processing mode. By contrast, in reduced operating mode only three of every thirteen samples are processed, thus requiring only about 7.5 MIPS. This results in a processing reduction of roughly seventy seven percent of processing operations.

In the above described embodiment, the pulse shaping filter 206 will be used to process the identified highest energy sample point and the two sample points adjacent to the highest energy point. As quadratic fit is used to further refine the synchronization point estimate, as discussed in detail in co-pending patent application Ser. No. 09/295,660. The actual sample rate in the preferred embodiments is 260 kHz (and this sample rate is down sampled by five to a 52 kHz rate for the received signal). The sample point at the 260 kHz rate that is closest to the maximum energy point indicated by the quadratic fit is used as the synchronization point. The start of the receive slot is adjusted so that the synchronizing sample point occurs as the seventh receive sample point (at the 52 kHz rate). The adjustment to symbol synchronization are preferably made every 16 receive slots and are averaged, allowing the peak energy synchronization sample point to be traced.

In the preferred embodiments, every slot is 120 symbols in length. Depending on the particular system design, the synchronizing sample points could possible drift past the adjacent sample point. This drift can be compensated for in a second preferred embodiment, in which every other sample point is used for the quadratic fit. In other words, with reference to FIG. 5, rather than performing a quadratic fit using sample points 109, 111, and 113, in the second preferred embodiment, sample points 107, 111, and 115 would be used. Note that this allows for a much wider deviation in the highest energy point and still be within the range of sample points used for the quadratic fit. Using adjacent sample points is usually adequate for tracking the synchronizing point, since clock drifts are usually slow. Another preferred embodiment approach uses only receive samples at the receive sample rate (i.e. 52 kHz for the preferred embodiments) and interpolates the received data to get sub-sample accuracy. Yet another approach would be to allow the synchronizing sample point to "drift" and to re-synchronize after the synchronizing sample point approaches a symbol boundary.

An alternative approach to maintaining synchronization is to allow pulse shaping filter to operate adaptively in reduced processing mode. In such an embodiment, synchronization circuit 208 will track the trend of peak 502 relative to samples 109 through 113. As an example, assuming for a moment that during initial signal acquisition, the peak energy (i.e. the information bearing point), aligned perfectly with sample point 111. Synchronization circuit 208 will send control signals to pulse shaping filter 206 to enter reduced processing mode and to only process those samples corresponding to sample points 109 through 113. Pulse shaping filter will then process those three sample points, will skip the next ten sample points (after down sampling to 52 kHz), and then will sample the next sample points 109 through 113 for the next incoming symbol.

In some alternative embodiments, synchronization circuit 208 will track the drift of peak 502 relative to the sample points. Assume over time that the peak 502 slowly drifts toward sample point 113. This drift will be recognized the interpolator function of synchronization circuit 208, as described in co-pending application Ser. No. 09/561,706. When the interpolated peak drifts to a certain threshold point, preferably the halfway point between samples 111 and 113, synchronization circuit 208 will instruct pulse shaping filter to begin processing samples 111, 113, and 115. In this way, pulse shaping filter 206 adaptively processes only the sample points closest to the actual peak. Likewise, if synchronization circuit 208 determined from the interpolator that the actual peak was drifting closer to sample 111, then pulse shaping filter 206 would be instructed to begin processing samples 109, 111, and 113. In this way, pulse shaping filter is adaptively corrected to process the samples most corresponding to the actual information point. Of course, significant drift should not occur because the clock rate will drift only slowly over time. Because the synchronization point is re-calculated periodically, such as every 16 slots in the described embodiments, the synchronizing point will generally be re-calculated before significant drift occurs.

In yet another embodiment, pulse shaping filter 206 is configured to process the highest energy sample point and the second point in each direction. In FIG. 4, this would correspond to points 107, 111, and 115 (as opposed to point 109, 111, and 113 in the previously discussed embodiment). Synchronization circuit 208 will interpolate between these three points in order to find the actual information bearing point, so the fact that the two closest points to 111 are skipped does not matter for purposes of synchronization. This embodiment would be preferable when the signal waveform is changing rapidly and the peak point would rapidly drift outside the bounds of points 109, 111, 113. Instead, by bounding the reduced mode processing over a wider portion of the curve (the portion of the curve between points 107 and 115), more drift can be tolerated before synchronization circuit is unable to interpolate and the pulse shaping filter must be returned to full processing mode in order to re-acquire synchronization.

Many of the features and functions discussed above can be implemented in software running on a digital signal processor or microprocessor, or preferably a combination of the two. Alternatively, dedicated circuits can be employed to realize the advantages of the above described preferred embodiments.

Moreover, while being described thus far in terms of a radio frequency system, the present invention may also be applied to any number of different applications. For example, the present invention may be applied to wireline systems, cable modems, two-way fiber optic links, and point-to-multipoint microwave systems.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A method of synchronizing with a transmitted signal, said method comprising:

receiving said transmitted signal, wherein said signal comprises a periodic information bearing point, at an information rate and wherein an information period is the inverse of said information rate;

sampling said signal at a sampling rate greater than said information rate;

down sampling from said sampling rate wherein more than N sample points are sampled per information period to a filtering rate of N sample points per information period prior to step of filtering each of N sample points;

during a first predetermined number of information periods, filtering each of N sample points for each information bearing point with a pulse-shaping filter and outputting a filtered signal;

measuring a variable of said filtered signal at each of said N sample points, wherein said variable is independent of information content in said signal;

determining the location of said information bearing point in said signal based on said information content-independent variable;

identifying one of the N sample points that most closely corresponds to said information bearing point in said signal;

synchronizing processing of said signal with said information bearing point; and during a second number of subsequent information periods, filtering a subset of the N sample points for each subsequent information period, the subset of the N sample points including the identified one of the N sample points.

2. The method of claim 1 wherein the subset of N sample points consists of the identified one of the N sample points[,] and each adjacent sample point.

3. The method of claim 1 wherein the subset of N sample points consists of the identified on*e* of the N sample points and one proceeding and one subsequent sample point of the N sample points.

4. The method of claim 1, wherein said information bearing point occurs between two of said sample points and *wherein the method* further [comprising,] *comprises:* interpolating between sample points to determine the information bearing point during the first predetermined number of information periods; [and]

interpolating between the subset of N sample points during the second number of subsequent information periods;

tracking the results of the step of interpolating between the subset of N sample points; and updating the subset of N sample points in response to the tracking steps.

5. The method of claim 1 wherein the subset of N sample points is updated when the results of the interpolation step [identifies] *identify* the information bearing point as being more than halfway between two or the N sample points.

6. The method of claim 1 wherein N equals thirteen sample points for each information bearing point.

7. The method of claim 1 wherein said information bearing point corresponds to a quadrature amplitude modulated symbol.

8. The method of claim 1, wherein said pulse-shaping filter meets Nyquist criteria.

9. The method of claim 1 wherein said first predetermined number of information periods is 1320 periods.

10. The method of claim 1 wherein said second number of information periods is 1320 periods.

11. The method of claim 1 wherein the second number of information periods is variable.

12. The method of claim 4, *wherein* the second number of information periods is determined from the frequency with which the updating [step] occurs.

13. A telecommunication receiver capable of synchronizing with a received signal, said receiver comprising:

an analog-to-digital converter receiving an information signal, wherein said signal comprises a periodic information bearing point at an information rate, and wherein an information period is the inverse of said information rate;

a pulse shaping filter coupled to receive a digital signal from said analog-to-digital converter and to receive a control signal from a synchronization unit, wherein said digital signal comprises N sample points per said information period, the pulse shaping filter configured to operate in a first mode in which each of N sample points per information period is filter and a second mode in which a subset of N sample points per information period is filtered; and said synchronization unit coupled to receive a pulse shaped sampled signal from said filter, said synchronization unit comprising:

a detector determining values of a variable of said signal at said N sample points when said pulse shaping filter is operating in said first mode and of said subset of N sample points when said pulse shaping filter is operating in said second mode, wherein said variable is independent of information content in said signal;

an accumulator to accumulate said detected values for each of said sample points which occurs at the same relative sample location within each information period, wherein there are (sample rate)/(information rate) sample locations within each information period;

sample bins for storing said accumulated values for said sample locations; [and]

a comparator for comparing said accumulated values in said sample bins, wherein the location of said information bearing point in said signal is determined based on said accumulated information content-independent values;

an identifier for identifying the relative sample location most closely corresponding to the information bearing point; and a control signal generator for generating a control signal to said pulse shaping filter, the control signal including the [identify] *identity* of the identified relative sample location.

14. The receiver of claim 13 wherein the pulse shaping filter further comprises: a down sampler receiving the digital signal from the analog-to-digital converter at a first sampling rate and outputting the digital signal at a second sampling rate, the second sampling rate being equivalent to N samples per information period.

15. The receiver of claim [13] *14* wherein the first sampling rate is 260 kHz and the second sampling rate is 52 kHz and N is equal to 13.

16. The receiver of claim 13 [wherein the pulse shaping filter and the synchronization unit are embodied as routines performed by], *further comprising* a digital signal processor *configured to implement the pulse shaping filter and the synchronization unit.*

17. The receiver of claim 13 wherein the subset of N sample points is the identified sample point corresponding to the identified relative sample location most closely corresponding to the information bearing point and one additional sample point on either side of the identified one relative sample location.

18. The receiver of claim 17 wherein the additional sample point on either side of the identified sample point is the next adjacent sample point on either side of the identified sample point.

19. The receiver of claim 13 wherein the pulse shaping filter operates in the first mode during signal acquisition and operates in the second mode for a predetermined number of information periods subsequent to signal acquisition.

*20. A method, comprising:*

*down sampling a sampled signal from an initial sampling rate wherein more than N sample points are sampled per information period, said initial sampling rate being greater than an information rate of a signal being sampled to obtain said sampled signal, to a filtering rate of N sample points per information period prior to filtering each of N sample points;*

*during a first predetermined number of information periods, filtering each of N sample points for each*

*information bearing point with a pulse-shaping filter and outputting a filtered signal;*

*measuring a variable of said filtered signal at each of said N sample points, wherein said variable is independent of information content in said signal;*

*determining the location of said information bearing point in said signal based on said information content-independent variable;*

*identifying one of the N sample points that most closely corresponds to said information bearing point in said signal;*

*synchronizing processing of said signal with said information bearing point; and*

*during a second number of subsequent information periods, filtering a subset of the N sample points for each subsequent information period, the subset of the N sample points including the identified one of the N sample points.*

*21. The method of claim 20, wherein the subset of N sample points consists of the identified one of the N sample points and each adjacent sample point.*

*22. The method of claim 20, wherein the subset of N sample points consists of the identified one of the N sample points and one proceeding and one subsequent sample point of the N sample points.*

*23. The method of claim 20, wherein said information bearing point occurs between two of said sample points, and wherein the method further comprises:*

*interpolating between sample points to determine the information bearing point during the first predetermined number of information periods;*

*interpolating between the subset of N sample points during the second number of subsequent information periods;*

*tracking the results of the step of interpolating between the subset of N sample points; and*

*updating the subset of N sample points in response to the tracking steps.*

*24. The method of claim 23, wherein the subset of N sample points is updated when the results of said interpolating identify the information bearing point as being more than halfway between two of the N sample points.*

*25. The method of claim 20, wherein said information bearing point corresponds to a quadrature amplitude modulated symbol.*

*26. The method of claim 20, wherein said pulse-shaping filter meets Nyquist criteria.*

*27. The method of claim 20, wherein the second number of information periods is variable.*

*28. The method of claim 20, wherein the second number of information periods is determined from a frequency with which said updating occurs.*

*29. An apparatus comprising:*

*a pulse shaping filter to receive a digital signal corresponding to a sampled information-bearing received signal that includes a periodic information-bearing point having an information period, whose inverse is a corresponding information rate, and to receive a control signal from a synchronization unit, wherein said digital signal comprises N sample points per said information period, the pulse shaping filter configured to operate in a first mode in which each of N sample points per information period is to be filtered and a second mode in which a subset of N sample points per information period is to be filtered; and*

*said synchronization unit to receive a pulse shaped sampled signal from said filter, said synchronization unit comprising:*

*a detector to determine values of a variable of said signal at said N sample points when said pulse shaping filter is operating in said first mode and of said subset of N sample points when said pulse shaping filter is operating in said second mode, wherein said variable is independent of information content in said signal;*

*an accumulator to accumulate said detected values for each of said sample points which occurs at the same relative sample location within each information period;*

*sample bins to store said accumulated values for said sample locations; and*

*a comparator to compare said accumulated values in said sample bins, wherein the location of said information bearing point in said signal is to be determined based on said accumulated information content-independent values;*

*an identifier to identify the relative sample location most closely corresponding to the information bearing point; and*

*a control signal generator to generate said control signal, the control signal to include the identity of the identified relative sample location.*

*30. The apparatus of claim 29, wherein the pulse shaping filter further comprises:*

*a down sampler to receive the digital signal at a first sampling rate and to output the digital signal at a second sampling rate, the second sampling rate being equivalent to N samples per information period.*

*31. The apparatus of claim 29, wherein the pulse shaping filter and the synchronization unit are embodied as routines to be executed by a processor.*

*32. The apparatus of claim 29, wherein the subset of N sample points is the identified sample points corresponding to the identified relative sample location most closely corresponding to the information bearing point and one additional sample point on either side of the identified one relative sample location.*

*33. The apparatus of claim 32, wherein the additional sample point on either side of the identified sample point is the next adjacent sample point on either side of the identified sample point.*

*34. The apparatus of claim 29, wherein the pulse shaping filter operates in the first mode during signal acquisition and operates in the second mode for a predetermined number of information periods subsequent to signal acquisition.*

*35. An apparatus comprising:*

*a pulse shaping filter to receive a digital signal corresponding to a sampled information-bearing received signal that includes a periodic information-bearing point having an information period and to receive a control signal from a synchronization unit, wherein said digital signal comprises N sample points per said information period, the pulse shaping filter configured to operate in a first mode in which each of N sample points per information period is to be filtered and in a second mode in which a subset of N sample points per information period is to be filtered; and*

*said synchronization unit to receive a pulse shaped sampled signal from said filter, said synchronization unit comprising:*

*a detector to determine values of a an information-content-independent quantity based on said signal at*

*said N sample points when said pulse shaping filter is operating in said first mode and of said subset of N sample points when said pulse shaping filter is operating in said second mode;*

*an accumulator to accumulate said detected values for each of said sample points that occurs at the same relative sample location within each information period, to thus obtain accumulated values;*

*a comparator to compare said accumulated values, wherein the location of said information bearing point in said signal is to be determined based on said accumulated values; and*

*a control signal generator to generate said control signal, wherein said control signal is to identify the location of said information bearing point in said signal.*

*36. The apparatus of claim 35, wherein the pulse shaping filter further comprises:*

*a down sampler to receive the digital signal at a first sampling rate and to output the digital signal at a second sampling rate, the second sampling rate being equivalent to N samples per information period.*

*37. The apparatus of claim 35, further comprising a digital signal processor configured to implement the pulse shaping filter and the synchronization unit.*

*38. The apparatus of claim 35, wherein the subset of N sample points is the identified sample point corresponding to the identified relative sample location most closely corresponding to the information bearing point and one additional sample point on either side of the identified one relative sample location.*

*39. The apparatus of claim 38, wherein the additional sample point on either side of the identified sample point is the next adjacent sample point on either side of the identified sample point.*

*40. The apparatus of claim 35, wherein the pulse shaping filter operates in the first mode during signal acquisition and operates in the second mode for a predetermined number of information periods subsequent to signal acquisition.*

*41. A processor-readable medium containing instructions that, when executed by a processor, cause the processor to implement a method comprising:*

*down sampling a sampled signal from an initial sampling rate wherein more than N sample points are sampled per information period, said initial sampling rate being greater than an information rate of a signal being sampled to obtain said sampled signal, to a filtering rate of N sample points per information period prior to filtering each of N sample points;*

*during a first predetermined number of information periods, filtering each of N sample points for each information bearing point with a pulse-shaping filter and outputting a filtered signal;*

*measuring an information-content-independent quantity based on said filtered signal at each of said N sample points;*

*determining the location of said information bearing point in said signal based on said quantity;*

*identifying one of the N sample points that most closely corresponds to said information bearing point in said signal;*

*synchronizing processing of said signal with said information bearing point; and*

*during a second number of subsequent information periods, filtering a subset of the N sample points for each subsequent information period, the subset of the N sample points including the identified one of the N sample points.*

*42. The medium of claim 41, wherein the subset of N sample points consists of the identified one of the N sample points and each adjacent sample point.*

*43. The medium of claim 41, wherein the subset of N sample points consists of the identified one of the N sample points and one proceeding and one subsequent sample point of the N sample points.*

*44. The medium of claim 41, wherein said information bearing point occurs between two of said sample points, and wherein the method further comprises:*

*interpolating between sample points to determine the information bearing point during the first predetermined number of information periods;*

*interpolating between the subset of N sample points during the second number of subsequent information periods;*

*tracking the results of the step of interpolating between the subset of N sample points; and*

*updating the subset of N sample points in response to the tracking steps.*

*45. The medium of claim 44, wherein the subset of N sample points is updated when the results of said interpolating identify the information bearing point as being more than halfway between two of the N sample points.*

*46. The medium of claim 41, wherein said information bearing point corresponds to a quadrature amplitude modulated symbol.*

*47. The medium of claim 41, wherein said pulse-shaping filter meets Nyquist criteria.*

*48. The medium of claim 41, wherein the second number of information periods is variable.*

*49. The medium of claim 44, wherein the second number of information periods is determined from a frequency with which said updating occurs.*

* * * * *

UNITED STATES PATENT AND TRADEMARK OFFICE

CERTIFICATE OF CORRECTION

PATENT NO. : RE 40,810 E
APPLICATION NO. : 11/826023
DATED : June 30, 2009
INVENTOR(S) : Robert McCarty, Jr.

It is certified that error appears in the above-identified patent and that said Letters Patent is hereby corrected as shown below:

Claim 35, column 12, line 66, please amend "a an" to read "an".

Signed and Sealed this

Twenty-ninth Day of September, 2009

David J. Kappos

David J. Kappos
*Director of the United States Patent and Trademark Office*